Jan. 31, 1956
A. D. ESPOSITO
2,733,329
DEMAGNETIZING METHOD
Filed June 23, 1952
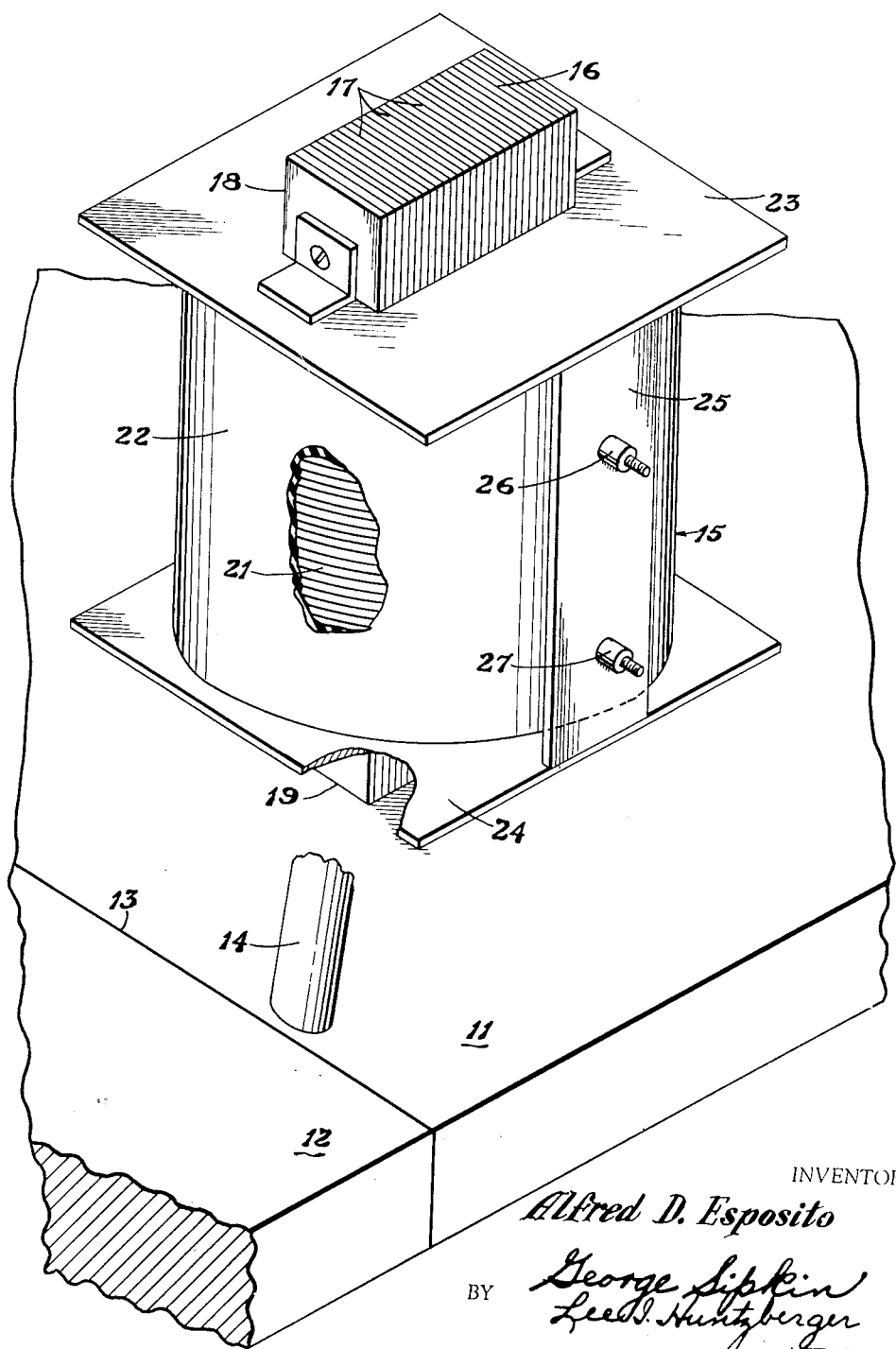
INVENTOR
*Alfred D. Esposito*
BY *George Sipkin*
*Lee J. Huntzberger*
ATTORNEYS United States Patent Office 2,733,329
Patented Jan. 31, 1956

2,733,329

DEMAGNETIZING METHOD

Alfred D. Esposito, New York, N. Y.

Application June 23, 1952, Serial No. 295,133

2 Claims. (Cl. 219—10)

(Granted under Title 35, U. S. Code (1952), sec. 266)

The invention described herein may be manufactured and used by or for the Government of the United States of America for governmental purposes without the payment of any royalties thereon or therefor.

The present invention concerns a method and apparatus for conditioning the properties of a workpiece; in particular the invention concerns a method and apparatus for electromagnetically conditioning the properties of a steel plate that is to be arc welded. In its preferred embodiment the invention concerns the method and apparatus for demagnetizing a steel plate that is to be arc welded.

In arc welding the adjacent edges or surfaces of metals are fused so that they flow together into a common mass of metal. Fusing is accomplished by the concentration of heat in the electric circuit at the air or gas gap of the arc. A conventional manner of welding metal such as steel is to use as a source of power a welding machine that supplies alternating curent of desired voltage and amperage. Using this type of equipment with conventional electrodes in forming a conventional weld, such as a butt weld, it is often impossible to run a satisfactory bead because molten metal from the welding rod spatters and is ejected from the welding line.

In numerous plate-welding operations where spattering has been so pronounced as to render the weld defective, I have tested with an ordinary magnetic compass the region of the plate being welded where spattering occurs and I have discovered that the plate in such region is magnetized. Many of the tests disclosed that the region of spattering is characterized by south polarity. I have discovered that if an electromagnet is placed adjacent the plate to be welded with a pole in contact with the plate surface and spaced from the region of spatter, and if the electromagnet is energized so that the pole in contact with the plate is of opposite polarity to the region of spatter, the spattering can be reduced and eliminated. Preferably the electromagnet is energized simultaneously with the welding operation. Critical factors are the polarity of the electromagnetic field, the intensity of the electromagnetic field and the location of the field relative to the plate surface and the region of spatter.

An object of the present invention is to provide a method and apparatus for conditioning the properties of a workpiece.

Another object is to provide a method and apparatus for electromagnetically conditioning the properties of a steel plate that is to be arc welded.

Another object is to provide a method of conditioning the properties of a workpiece by providing a magnetic field and locating the field in selected position relative to the workpiece.

Another object is to provide a method of arc welding a steel plate by generating an electromagnetic field by direct current and controlling the polarity and intensity of the field, and locating the field with the north pole substantially at the plate surface and about 4 inches from the portion of the plate to be welded.

Another object is to provide in combination with the workpiece means for treating the workpiece and magnetic means located adjacent the workpiece in selected position relative to the treating means.

Another object is to provide in combination with the steel plate to be arc welded a welding electrode and an electromagnet adjacent the workpiece and positioned with its north pole in contact with the plate surface about 4 inches from the portion of the plate to be welded.

Other objects and many of the attendant advantages of this invention will be readily appreciated as the same becomes better understood by reference to the following detailed description when considered in connection with the accompanying drawings wherein:

The single figure is an isometric view showing two plates in position for butt welding with an arc electrode shown diagrammatically and with an electromagnet located with one pole in contact with one of the plates in spaced relation to the line of weld.

In the drawing there are shown plates 11 and 12 that are in abutting relationship along line 13. Plates 11 and 12 are formed of metal that is to be welded and in a preferred embodiment of the invention plates 11 and 12 are formed of steel. Shown diagrammatically is a welding electrode 14 disposed adjacent line 13 for running a bead along line 13. Welding electrode 14 includes conventional material suitable for use in arc welding.

Disposed above plate 11 in close proximity thereto and preferably resting thereon is an electromagnet 15 having a core 16 formed of multiple laminations 17. Core 16 is formed of magnetic material. Core 16 is shown as being of bar shape and rectangular in cross section but if desired the extremities of core 16 which form poles 18 and 19 can be of T-shape. Between poles 18 and 19 core 16 is wound with wire to form a solenoid coil 21. The wire used can be of any suitable electrically conductive material. Solenoid coil 21 is provided with an external sheath 22 of asbestos.

At the extremities of coil 21 are provided end plates 23 and 24 of metal. A strip 25 of metal is provided between end plates 23 and 24 along sheath 22. Mounted upon strip 25 are a pair of binding posts 26 and 27 which at their inner ends are connected (not shown) with opposite ends of solenoid coil 21. The exposed portions of binding posts 26 and 27 are adapted for connection by suitable leads (not shown) to a power source.

In operation the electromagnet 15 is placed adjacent the steel plate 11 with pole 19 in contact with the surface of steel plate 11 and spaced from welding line 13. The polarity of steel plate 11 along the welding line 13 is determined by a compass. Electromagnet binding posts 26 and 27 are then connected so that electromagnet 15 is energized in such manner that pole 19 is of opposite polarity to plate 11 along welding line 13. With electromagnet 15 energized, welding electrode 14 is manipulated to strike an arc and a bead is run along welding line 13.

It is of the essence of applicant's invention that the electromagnet 15 be located with a pole thereof in close proximity to and preferably in contact with the surface of steel plate 11 and with core 16 of the electromagnet extending substantially perpendicular to the surface of plate 11. It also is of the essence of applicant's invention that electromagnet pole 19 be spaced from welding line 13. It is also of the essence of applicant's invention that electromagnet 15 be energized so that pole 19 is of opposite polarity to welding plate 11 along welding line 13 and that the intensity of the electromagnetic field generated by electromagnet 15 be controlled.

Obviously many modifications and variations of the present invention are possible in the light of the above teachings. It is therefore to be understood that within

I claim:

1. A method of arc welding a steel plate at a portion thereof, said method comprising the steps of generating an electromagnetic field by direct current, said field having a linear axis terminating in point poles controlling the polarity of said field, controlling the intensity of said field, locating said field with the magnetic axis normal to the plate surface and with the north pole touching the plate surface and about four inches from said plate portion to condition the magnetic properties of said steel workpiece and with the south pole remote from said plate surface, and forming an arc at said plate portion and regulating and moving the arc along the line of desired juncture.

2. A method of arc welding a steel plate at a portion thereof, said method comprising the steps of; generating a unidirectional magnetic field having a linear axis originating at a point on the plate surface about four inches from said plate portion and extending perpendicularly away from the plate surface and terminating with a south pole, forming an arc at said plate portion, and regulating and moving the arc along the line of desired juncture.

References Cited in the file of this patent

UNITED STATES PATENTS

| | | |
|---|---|---|
| 1,169,251 | Gaffney | Jan. 25, 1916 |
| 1,246,658 | Reid | Nov. 13, 1917 |
| 1,524,714 | Kjekstad | Feb. 3, 1925 |
| 1,840,330 | Priebe | Jan. 12, 1932 |
| 1,947,077 | Chapman | Feb. 13, 1934 |
| 2,001,179 | Brugge | May 14, 1935 |
| 2,019,320 | Runner | Oct. 29, 1935 |